Patented Mar. 13, 1951

2,545,092

UNITED STATES PATENT OFFICE 2,545,092

ACYLAMIDO-HYDROXY-PROPIO-NAPHTHONES

Loren M. Long, Grosse Pointe Woods, and Harvey D. Troutman, Ferndale, Mich., assignors to Parke, Davis & Company, Detroit, Mich., a corporation of Michigan No Drawing. Application January 21, 1950, Serial No. 139,955

7 Claims. (Cl. 260—562)

This application is a continuation in part of our co-pending application, Serial Number 83,770, filed March 26, 1949, now U. S. Patent 2,516,130, and the invention relates to new keto amido alcohols and to chemical methods useful for their synthesis. More particularly, the invention relates to naphthyl α-acylamido-β-hydroxyethyl ketone compounds having the formula,

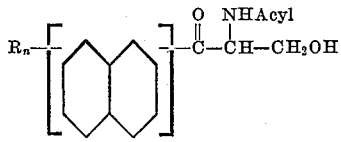

where n is 1 or 2, and R is the same or different and represents hydrogen, halogen, nitro, lower alkyl, or lower alkoxy radicals. The term "acyl" as used herein includes such acyl radicals as saturated and unsaturated lower aliphatic acyl, halogen substituted lower aliphatic acyl, carboxy substituted lower aliphatic acyl, cyano substituted lower aliphatic acyl, ether substituted lower aliphatic acyl, ester substituted lower aliphatic acyl, hydroxy substituted lower aliphatic acyl, benzoyl, substituted benzoyl, araliphatic acyl, furoyl, pyridinoyl and the like radicals.

In accordance with the invention, naphthyl α-acylamido-β-hydroxyethyl ketone compounds having the above formula are obtained by condensing a naphthyl acylamidomethyl ketone of formula,

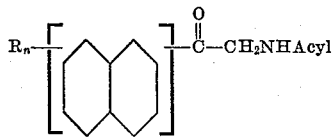

with formaldehyde in the presence of an alkaline condensation catalyst, where R and n have the same significance as given above. The transformation involved can be diagrammatically illustrated as follows:

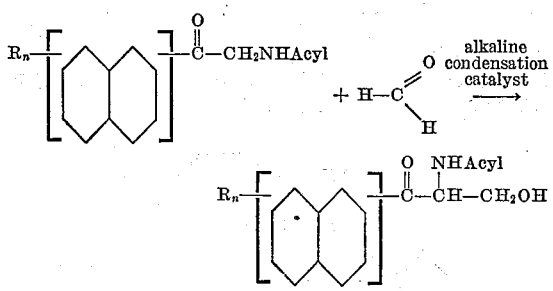

where R and n have the same significance as given above.

In carrying out this condensation, the formaldehyde may be supplied to the reaction mixture in a number of different forms. For example, formaldehyde gas, aqueous or alcoholic solutions of formaldehyde, paraformaldehyde and other formaldehyde-yielding polymers may be used. In most cases it has been found preferable to use an excess of formaldehyde, usually up to about four or five moles, in order to insure completeness of the condensation reaction.

A variety of solvents, alkaline condensation catalysts, and reaction conditions may also be employed. As solvents, either aqueous or anhydrous lower aliphatic alcohols are particularly advantageous, but moist dialkyl ethers and dioxane-water mixtures may also be used. The alkaline condensation catalysts used in this phase of the invention may be organic bases, inorganic bases, or inorganic salts of acidic or pseudo acidic organic compounds. Some representative types of these catalysts are the hydroxides, oxides, carbonates, bicarbonates, and amides of alkali or alkali earth metals, alkali metal alkoxides, alkali earth alkoxides, alkali metal phenolates, alkali metal salts of lower aliphatic carboxylic acids, organic tertiary amines and quaternary ammonium hydroxides of organic tertiary amines. In general, the weakly alkaline catalysts, such as sodium bicarbonate, potassium bicarbonate, calcium hydroxide, pyridine, triethyl amine, N-ethyl morpholine, N,N-dimethyl aniline, and the like are preferred. They make the reaction much easier to control. When strongly alkaline catalysts, such as sodium hydroxide, potassium hydroxide, potassium carbonate, sodium methylate, sodium ethylate, and the like are used, care must be taken to remove or inactivate the catalyst as soon as the reaction is completed in order to prevent conversion of the desired product to the corresponding methylene bis compound by dehydration and coupling reaction. Although the amount of catalyst is not critical and can vary from a few hundredths or thousandths of a mole to one mole or more, it is preferable from the standpoint of yield to use only enough to bring about a relatively rapid reaction. In most cases 0.05 mole or less is sufficient.

The temperature used in carrying out this methylolation reaction as well as the time required for its completion varies with the catalyst used. In general, the reaction can be carried out at a temperature between 0° and 75° C. in a time varying from a few minutes to several hours. When strongly alkaline catalysts are used, the reaction proceeds very rapidly and is usually complete in a few minutes at room temperature or below. However, when mildly alkaline catalysts are employed, the reaction is not so rapid and usually requires from 15 minutes to several hours at room temperature or slightly above, that is, at about 25–50° C.

The products of the invention are useful as intermediates in the preparation of other organic compounds. They are of particular value in preparation of organic compounds possessing unique antibiotic activity.

The invention is illustrated by the following examples:

*Example 1*

60 g. of 1-naphthyl acetamidomethyl ketone is mixed with 300 cc. of methanol and 75 cc. of 40% formalin. 2 g. of sodium bicarbonate is added and the mixture is stirred at room temperature for about one hour. During this time the desired product separates. The insoluble 1-naphthyl α-acetamido-β-hydroxyethyl ketone of formula,

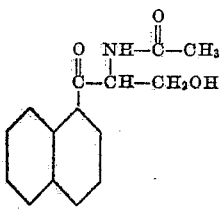

is collected and purified by recrystallization from ethyl acetate.

*Example 2*

50 g. of 4-methoxy-2-naphthyl phenylacetamidomethyl ketone is mixed with 12 g. of paraformaldehyde in 1 liter of methanol. The resulting mixture is treated with 0.4 g. of sodium bicarbonate and heated at 40° C. for about twenty minutes with stirring. 3 liters of ice water are added and the crude 4-methoxy-2-naphthyl α-phenylacetamido-β-hydroxyethyl ketone which separates collected, washed with water and purified by recrystallization from alcohol. The formula of this product is:

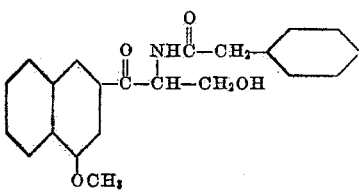

*Example 3*

A mixture consisting of 50 g. 4-nitro-1-naphthyl acetamidomethyl ketone and 75 cc. of 40% formalin in 450 cc. of methanol is treated with 2 g. of sodium bicarbonate and the resulting mixture heated at 45° C. for about one-half hour. The reaction mixture is poured into 1 and one-half liters of ice water and the crude 4-nitro-1-naphthyl α-acetamido - β - hydroxyethyl ketone which separates collected and washed with water. If desired, this product can be purified by recrystallization from methanol. Its formula is,

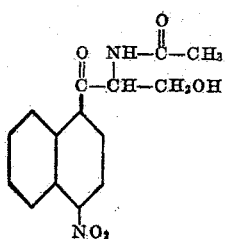

*Example 4*

A mixture consisting of 62 g. of 6-methyl-2-naphthyl p-toluylamidomethyl ketone, 300 cc. of methanol and 75 cc. of 40% formalin is treated with 2 g. of potassium bicarbonate. The mixture is stirred at 35° C. for about one and one-half hours, cooled and the insoluble 6-methyl-2-naphthyl α-(p-toluylamido)-β-hydroxyethyl ketone collected. This product is washed with water and dried in vacuo. Its formula is,

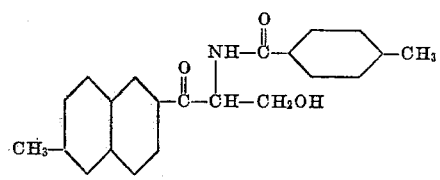

*Example 5*

A mixture consisting of 50 g. of 8-nitro-1-naphthyl acetamidomethyl ketone in 75 cc. of 40% formalin in 450 cc. of methanol is treated with 2 g. of sodium bicarbonate and the resulting mixture heated at 45° C. for about one-half hour. The reaction mixture is poured into one and one-half liters of ice water and the crude 8-nitro-1-naphthyl α-acetamido - β-hydroxyethyl ketone which separates is collected and washed with water. If desired this product can be purified by recrystallization from methanol. Its formula is,

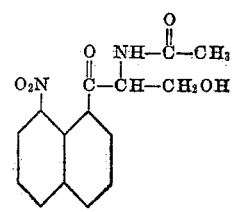

*Example 6*

A mixture of 50 g. of 1-nitro-2-naphthyl acetamidomethyl ketone in 75 cc. of 40% formalin in 450 cc. of methanol is treated with 2 g. of sodium bicarbonate and the resulting mixture heated at 45° C. for about one-half hour. The reaction mixture is poured into one and one-half liters of ice water and the crude 1-nitro-2-naphthyl α-acetamido-β-hydroxyethyl ketone which separates is collected and washed with water. This product can be purified by recrystallization from methanol. Its formula is,

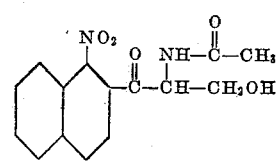

*Example 7*

A mixture consisting of 65 g. of 2,4-dimethyl-1-naphthyl p-toluylamidomethyl ketone, 300 cc. of methanol and 75 cc. of 40% formalin is treated with 2 g. of potassium bicarbonate. The mixture is stirred at 35° C. for about one and one-half hours, cooled and the insoluble 2,4-dimethyl-1-naphthyl α-(p-toluylamido)-β-hydroxyethyl ketone collected. This product is washed with water and dried in vacuo. Its formula is,

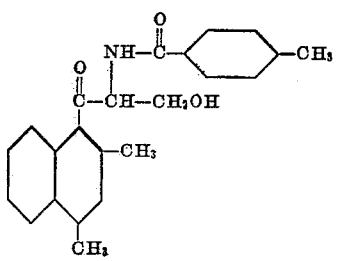

Example 8

A mixture consisting of 68 g. of 2-chloro-4-methyl-1-naphthyl p-toluylamidomethyl ketone, 350 cc. of methanol and 75 cc. of 40% formalin is treated with 2 g. of sodium bicarbonate and the mixture is stirred at 37° C. for about one and one-half hours, cooled, and the insoluble 2-chloro-4-methyl-1-naphthyl α-(p-toluylamido)-β-hydroxyethyl ketone collected. This product is washed with water and dried in vacuo. Its formula is,

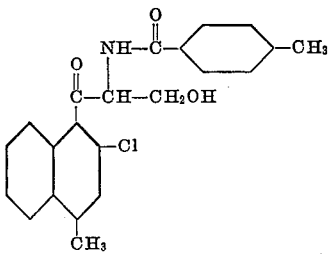

Example 9

53 g. of 4-iodo-1-naphthyl benzamidomethyl ketone is mixed with 12 g. of paraformaldehyde in one liter of methanol. The resulting mixture is treated with 4.5 g. of sodium bicarbonate and heated at 40° C. for about 20 minutes with stirring. 3 liters of ice water are added and the crude 4-iodo-1-naphthyl α-benzamido-β-hydroxyethyl ketone which separates is collected, washed with water, and purified by recrystallization from alcohol. The formula of this product is,

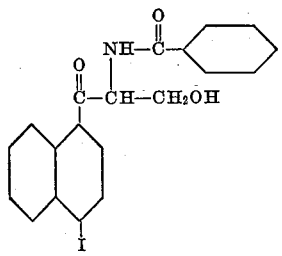

Example 10

52 g. of 6-bromo-2-naphthyl benzamidomethyl ketone is mixed with 12 g. of paraformaldehyde in one liter of methanol. The resulting mixture is treated with 0.4 g. of potassium bicarbonate and heated at 37° C. for about twenty minutes with stirring. 3 liters of ice water are added and the crude 6-bromo-2-naphthyl α-benzamido-β-hydroxyethyl ketone which separates is collected, washed with water and purified by recrystallization from alcohol. The formula of this product is,

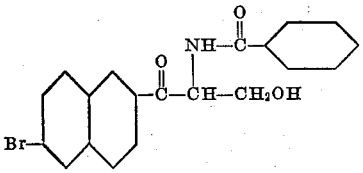

Example 11

62 g. of 1-naphthyl crotonylamidomethyl ketone is mixed with 325 cc. of methanol and 75 cc. of 40% formalin. 2 g. of potassium bicarbonate is added and the mixture stirred at room temperature for about one hour during which time the desired product separates. The insoluble 1-naphthyl α-crotonylamido-β-hydroxyethyl ketone of formula,

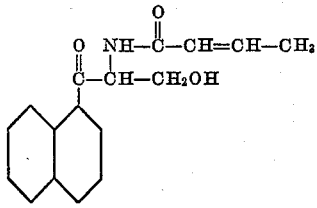

is collected and purified by recrystallization from ethyl acetate.

Example 12

45 g. of 5-ethyl-1-naphthyl bromoacetamidomethyl ketone is mixed with 12 g. of paraformaldehyde in 1 liter of methanol. The resulting mixture is treated with 0.4 g. of sodium bicarbonate and heated at 35° C. for about 20 minutes with stirring. 3 liters of ice water are added and the crude 5-ethyl-1-naphthyl α-bromoacetamido-β-hydroxyethyl ketone which separates is collected, washed with water and purified by recrystallization from ethanol. The formula of this product is,

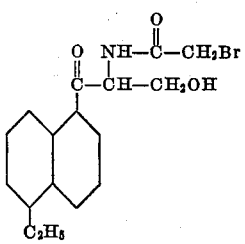

Example 13

65 g. of 4-nitro-1-naphthyl dichloroacetamidomethyl ketone is mixed with 350 cc. of methanol in 75 cc. of 40% formalin. 2 g. of sodium bicarbonate is added and the mixture is stirred at room temperature for about 1 hour during which time the desired product separates. The insoluble 4-nitro-1-naphthyl α-dichloroacetamido-β-hydroxyethyl ketone of formula,

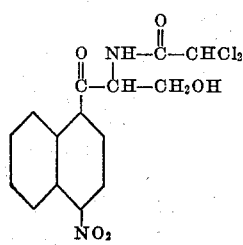

is collected and purified by recrystallization from ethyl acetate.

Example 14

48 g. of 4-ethoxy-1-naphthyl succinamidomethyl ketone is mixed with 12 g. of paraformaldehyde and 1 liter of methanol. The resulting mixture is treated with 0.4 g. of sodium bicarbonate and heated at 40° C. for twenty minutes with stirring. Two and one-half liters of ice water are added and the crude 4-ethoxy-1-naphthyl α-succinamido-β-hydroxyethyl ketone which separates is collected, washed with water and purified by recrystallization from alcohol. The formula of this product is,

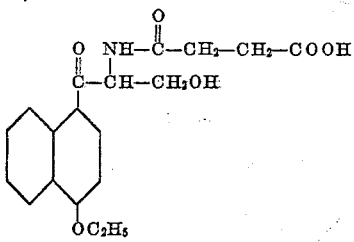

Example 15

70 g. of 8-chloro-1-naphthyl cyanoacetamidomethyl ketone is mixed with 350 cc. of methanol and 75 cc. of 40% formalin. 2.2 g. of potassium bicarbonate is added and the mixture is stirred at room temperature for about 1 hour during which time the desired product separates. The insoluble 8-chloro-1-naphthyl α-cyanoacetamido-β-hydroxyethyl ketone of formula,

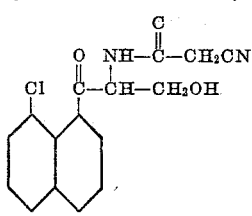

is collected and purified by recrystallization from ethyl acetate.

Example 16

65 g. of 1-naphthyl β-methoxypropionamidomethyl ketone is mixed with 300 cc. of methanol and 75 cc. of 40% formalin. 2 g. of sodium bicarbonate is added and the mixture stirred at room temperature for about one hour during which time the desired product separates. The solid is collected and purified by recrystallization from alcohol. The formula of this product is,

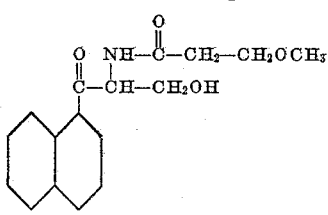

Example 17

65 g. of 1-naphthyl acetoxyacetamidomethyl ketone is mixed with 350 cc. of methanol and 75 cc. of 40% formalin. 2.3 g. of potassium bicarbonate is added and the mixture is stirred at room temperature for about one hour and a half during which time the desired product separates. The insoluble 1-naphthyl α-acetoxyacetamido-β-hydroxyethyl ketone of formula,

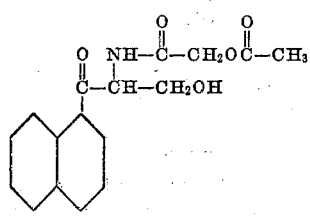

is collected and purified by recrystallization from ethylacetate.

Example 18

A mixture consisting of 6.0 g. of 7-ethyl-1-naphthyl furamidomethyl ketone, 30 cc. of methanol and 7.5 cc. of 40% formalin is treated with 0.2 g. of potassium bicarbonate. The mixture is stirred at 35° C. for about one and one-half hours, cooled and the insoluble 7-ethyl-1-naphthyl α-furamido-β-hydroxyethyl ketone collected. This product is washed with water and dried in vacuo. Its formula is,

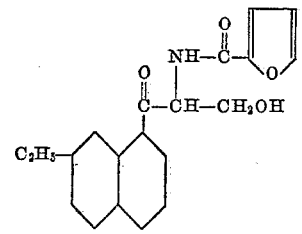

Example 19

48 g. of 7-chloro-1-naphthyl α-nicotinamidomethyl ketone, 280 cc. of methanol and 70 cc. of 40% formalin is treated with 1.8 g. of sodium bicarbonate. The mixture is stirred at 35° C. for about one and one-quarter hours, cooled and the insoluble 7-chloro-1-naphthyl α-nicotinamido-β-hydroxyethyl ketone collected. This product is washed with water and dried in vacuo. Its formula is,

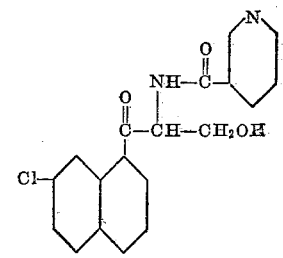

Example 20

45 g. of 1-naphthyl α-hydroxypropionamidomethyl ketone is mixed with 12 g. of paraformaldehyde and 1 liter of methanol. The resulting mixture is treated with 0.4 g. of sodium bicarbonate and heated at 40° C. for about twenty minutes with stirring. 3 liters of ice water are added and the crude 1-naphthyl α-hydroxypropionamido-β-hydroxyethyl ketone which separates is collected, washed with water and purified by recrystallization from alcohol. The formula of this product is,

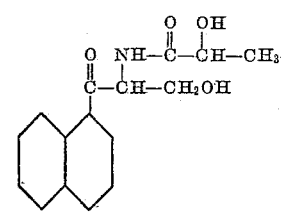

Example 21

A mixture consisting of 21 g. of 4-nitro-1-naphthyl fluoroacetamidomethyl ketone and 40 cc. of 40% formalin in 250 cc. of methanol is treated with 1.2 g. of potassium bicarbonate and the resulting mixture heated at 40° C. for about three-quarters of an hour. The reaction mixture is poured into one liter of ice water and the 4-nitro-1-naphthyl α-fluoroacetamido-β-hydroxyethyl ketone which separates is collected and washed with water. This product can be recrystallized from methanol. Its formula is,

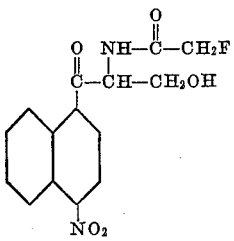

The naphthyl acylamidomethyl ketone compounds used as starting materials in the practice of the invention can be prepared by the reaction of a naphthyl ω-halomethyl ketone with hexamethylenetetramine, hydrolysis of the resulting complex with mineral acids followed by simultaneous neutralization and acylation of the naphthylamidomethyl ketone acid addition salts. For example, 1-naphthyl acetamidomethyl ketone, starting material used in Example 1, can be prepared as follows:

150 g. of hexamethylenetetramine dissolved in chloroform is added to 220 g. of 1-naphthyl bromomethyl ketone and the mixture allowed to stand at room temperature for about three hours. The 1-naphthyl bromomethyl ketone-hexamethylenetetramine complex is collected, washed with a little chloroform and dried. The formula of this product is,

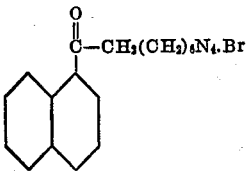

200 g. of 1-naphthyl bromomethyl ketone hexamethylenetetramine complex is added to 225 cc. of concentrated hydrochloric acid and 1200 cc. of absolute ethanol and the mixture is stirred overnight at room temperature. The insoluble hydrochloride salt of 1-naphthyl aminomethyl ketone is collected by filtration, washed with a small amount of cold water, and dried at room temperature. The formula of this product is,

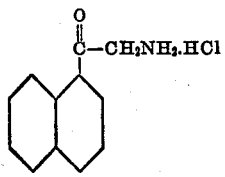

75 g. of 1-naphthyl aminomethyl ketone hydrochloride is dissolved in 500 cc. of glacial acetic acid and 300 cc. of acetic anhydride. 150 g. of sodium acetate is added in small portions with stirring and after the addition has been completed, the solution is diluted with water. 1-naphthyl acetamidomethyl ketone which separates is collected and recrystallized from methanol. The formula of this products is,

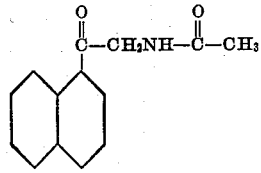

What we claim is:
1. A compound of formula,

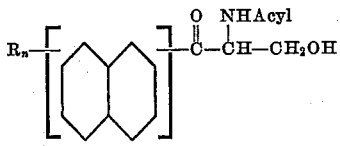

where *n* is one of the integers 1 and 2 and R is a member of the class consisting of hydrogen, halogen, nitro, lower alkyl and lower alkoxy radicals.

2. A compound of formula,

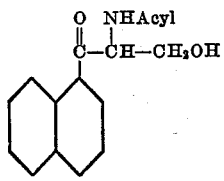

3. 1 - naphthyl α - acetamido - β - hydroxyethyl ketone.

4. A compound of formula,

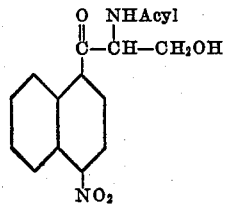

5. 4 - nitro - 1 - naphthyl α - acetamido - β - hydroxyethyl ketone.

6. 4 - nitro - 1 - naphthyl α - dichloroacetamido-β-hydroxyethyl ketone.

7. 4 - nitro - 1 - naphthyl α - fluoroacetamido-β-hydroxyethyl ketone.

LOREN M. LONG.
HARVEY D. TROUTMAN.

No references cited.